United States Patent [19]

Grant

[11] Patent Number: 5,509,339

[45] Date of Patent: Apr. 23, 1996

[54] DEVICE FOR REPAIRING A BROKEN RECIPROCATING SAW BLADE

[76] Inventor: Jaret E. Grant, 1751 Puowaina Dr., Honolulu, Hi. 96813

[21] Appl. No.: 263,724

[22] Filed: Jun. 22, 1994

[51] Int. Cl.⁶ .............................. B26D 3/08; B26D 11/00
[52] U.S. Cl. .................. 83/862; 83/682; 83/879; 76/112
[58] Field of Search .................... 76/112; 83/862, 83/863, 879, 880, 682

[56] References Cited

U.S. PATENT DOCUMENTS

| | | | |
|---|---|---|---|
| 2,352,339 | 6/1944 | Olney | 83/883 |
| 3,656,379 | 4/1972 | Clark | 83/877 |
| 4,599,126 | 7/1986 | Duffield | 83/862 |
| 5,410,928 | 5/1995 | Bakermans et al. | 83/155 |

*Primary Examiner*—Kenneth E. Peterson
*Attorney, Agent, or Firm*—Michael I. Kroll

[57] ABSTRACT

A device is provided for repairing a broken reciprocating saw blade, which consists of a base with a facility for mounting the base to a work surface. A first station is on the base. An assembly in the first station is for scoring a pattern of a new shank onto an end of the broken saw blade that is inserted into the first station. A second station is on the base. A unit in the second station is for punching out the new shank from the end of the broken saw blade that is inserted into the second station.

3 Claims, 2 Drawing Sheets

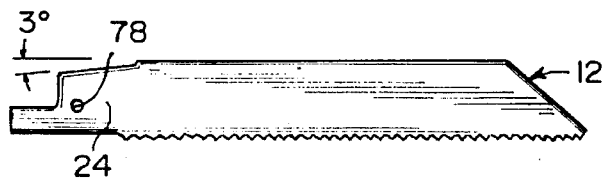
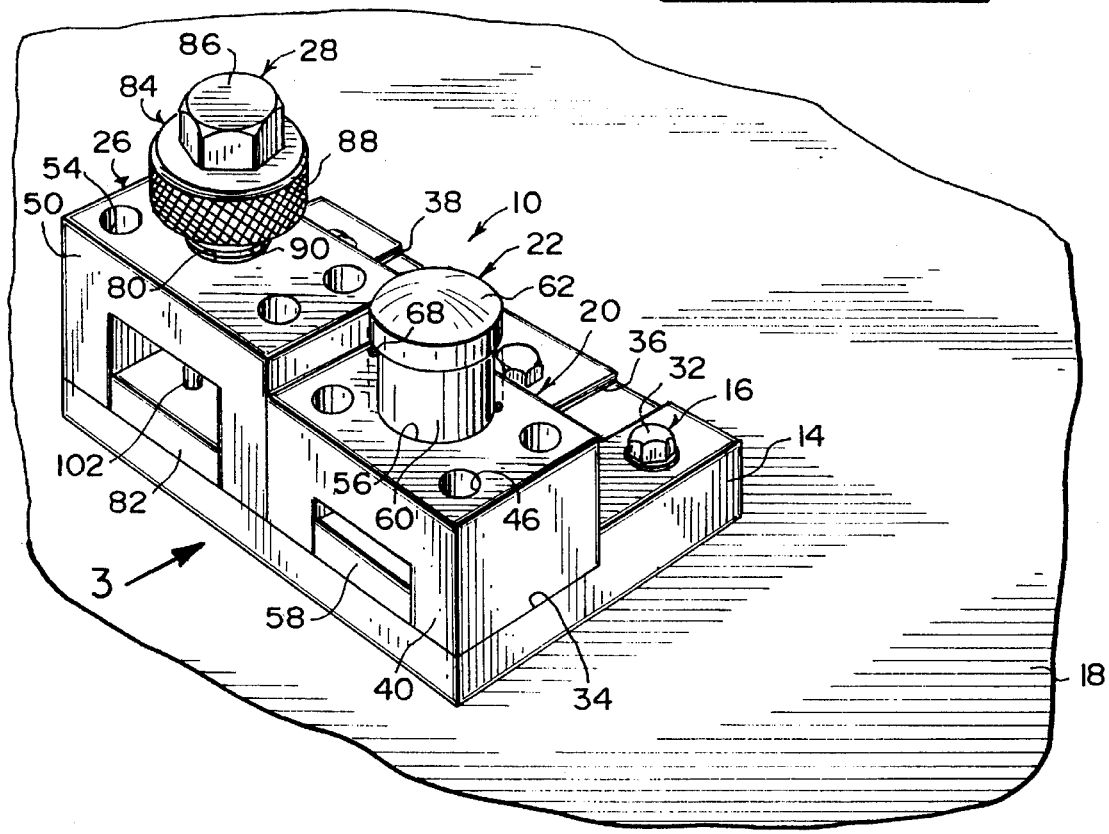
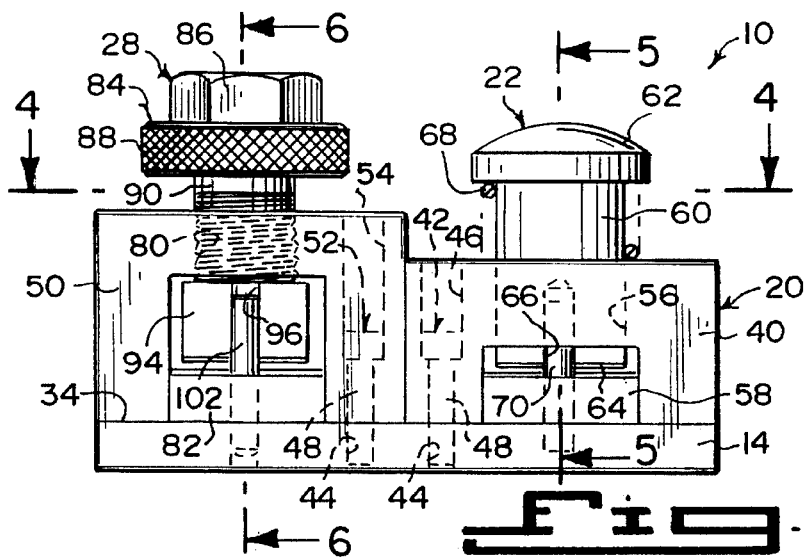

5,509,339

DEVICE FOR REPAIRING A BROKEN RECIPROCATING SAW BLADE

BACKGROUND OF THE INVENTION

1. Field of the Invention

The instant invention relates generally to perforating and cutting tools and more specifically it relates to a device for preparing a broken reciprocating saw blade.

2. Description of the Prior Art

Numerous perforating and cutting tools have been provided in prior art. For example U.S. Pat. Nos. 1,338,457 to McBee and 3,915,046 to Schmidt et al. are illustrative of such prior art. While these units may be suitable for the particular purpose to which they address, they would not be as suitable for the purposes of the present invention as heretofore described.

A punch comprising a base is provided with perforating shafts near its outer end. A plate is provided with perforating shafts. Beveled orifices near its outer end are adapted to receive the perforating shafts. The plate has guide shafts adjacent the inner side of the punch shafts. There are orifices in the base provided with springs adapted to actuate the guide shafts. The base is provided with posts to receive the guide shafts.

A cold cutting circular saw blade is provided of the attached-segment type, having a stepped-peripheral-margin saw plate to which segments having complementary shapes are affixed. The segment end-shape inclines at the front sharpening angle of the saw teeth.

SUMMARY OF THE INVENTION

The instant invention is a two station, manually operated device which transforms a broken reciprocating saw blade back into a usable blade. The device is constructed completely out of metal and measures approximately six inches wide, three and one half inches high and four inches in depth. The device is constructed to have removable scoring and cutting dies, which can be replaced should they become worn. Station one will score the necessary shank pattern into the broken end of the blade, when a piston is struck with a hammer. After the shank pattern is imprinted onto the blade, it is then inserted into station two. The turning of a knob will press out the shank pattern that was scored onto both sides of the blade in station one. The new shank of the blade can then be inserted back into the reciprocating saw and reused. The length and shape of the original blade will determine how many times it can be usefully milled and reused.

A primary object of the present invention is to provide a device for repairing a broken reciprocating saw blade that will overcome the shortcomings of the prior art devices.

Another object is to provide a device for repairing a broken reciprocating saw blade having two stations, in which the first station is for scoring a new shank pattern onto a broken saw blade, while the second station is for punching out the new shank.

An additional object is to provide a device for repairing a broken reciprocating saw blade, in which both the scoring and cutting dies can be removed and replaced when needed.

A further object is to provide a device for repairing a broken reciprocating saw blade that is simple and easy to use.

A still further object is to provide a device for repairing a broken reciprocating saw blade that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is an elevational view of a typical reciprocating saw blade with a reconstructed shank.

FIG. 2 is a perspective view of the instant invention mounted to a work surface for reconstructing the shank of a broken saw blade.

FIG. 3 is an elevational view taken in the direction of arrow 3 in FIG. 2.

DETAILED DESCRIPTION OF THE PREFERRED EMBODIMENTS

Figure 4:
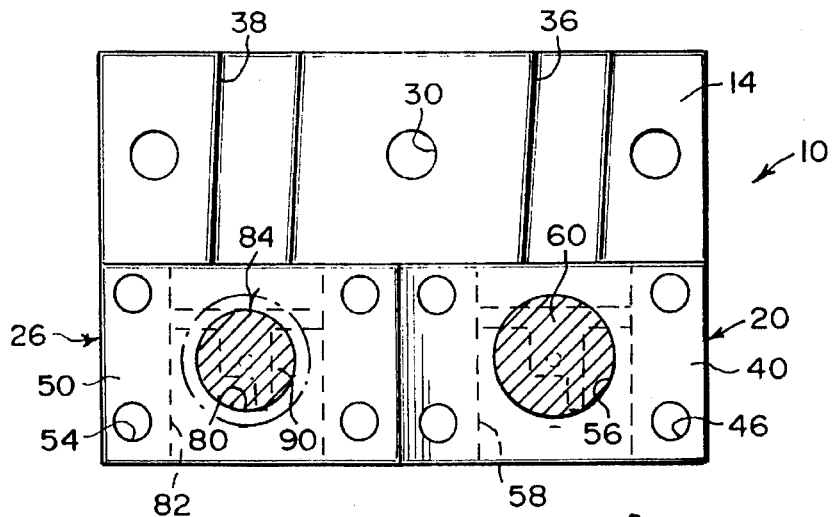
FIG. 4 is a cross sectional view taken along line 4—4 in FIG. 3.
Figures 5, 6:
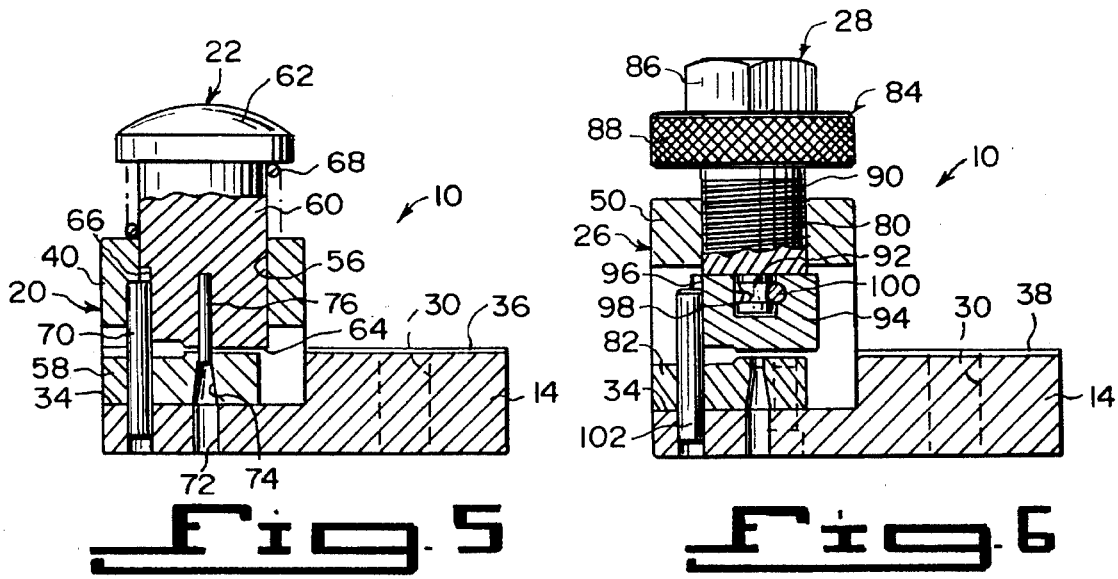
FIG. 5 is a cross sectional view taken along line 5—5 in FIG. 3, through the first scoring station.
FIG. 6 is a cross sectional view taken along line 6—6 in FIG. 3 through the second punching station.

Turning now descriptively to the drawings, in which similar reference characters denote similar elements throughout the several views, FIGS. 2 through 6 illustrate a device 10 for repairing a broken reciprocating saw blade 12, shown in FIG. 1, comprising a base 14 with a facility 16 for mounting the base 14 to a work surface 18. A first station 20 is on the base 14. An assembly 22 in the first station 20, is for scoring a pattern of a new shank 24 onto an end of the broken saw blade 12, that is inserted into the first station 20. A second station 26 is on the base 14. A unit 28 in the second station 26 is for punching out the new shank 24 from the end of the broken saw blade 12, that is inserted into the second station 26.

The mounting facility 16 includes the base 14 having a plurality of spaced apart holes 30 therethrough. A plurality of screws 32 are provided, with each inserted through one hole 30 in the base and then threaded into the work surface 18, so as to maintain the base 14 to the work surface 18.

The base 14 contains a recessed seat 34 extending thereacross, having a first slot 36 and a second slot 38 spaced away from the first slot 36, with both the slots 36, 38 extending at a slight angle transversely away from the recessed seat 34. The first station 20 consists of a first bridge housing 40 and a structure 42, for attaching the first bridge housing 40 within the recessed seat 34 in the base 14.

The attaching structure 42 includes the base 14 having a plurality of spaced apart threaded apertures 44 within the recessed seat 34. The first bridge housing 40 has a plurality of spaced apart bores 46, which align with one half of the threaded apertures 44 within the recessed seat 34, when the first bridge housing 40 is inserted therein. A plurality of bolts 48 are provided, with each inserted into one bore 46 in the first bridge housing 40 and then threaded into one aligned threaded aperture 44 in the recessed seat 34 of the base 14, to hold the first bridge housing 40 thereto.

The second station 26 consists of a second bridge housing 50. An assembly 52 is for affixing the second bridge housing 50 within the recessed seat 34 in the base 14 next to the first bridge housing 40.

The affixing assembly 52 includes the second bridge housing 50 having a plurality of spaced apart openings 54, which align with the other half of the threaded apertures 44 within the recessed seat 34, when the second bridge housing 50 is inserted therein next to the first bridge housing 40. One bolt 48 is inserted into one opening 54 in the second bridge housing 50, then is threaded into one aligned threaded aperture 44 in the recessed seat 34 of the base 14, to hold the second bridge housing 50 thereto.

Figure 7:
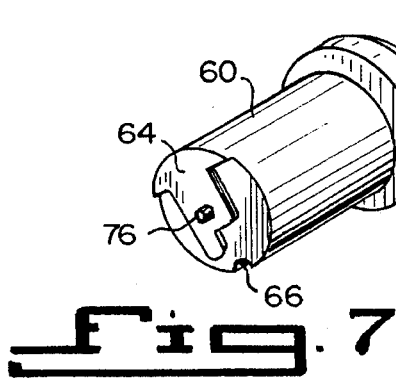
FIG. 7 is a bottom perspective view of the piston, showing the upper scoring die and hole punch therein.
Figure 8:
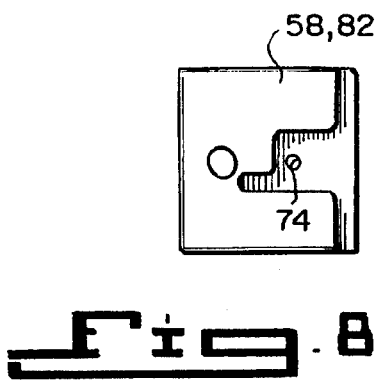
FIG. 8 is a top view of the lower scoring or cutting die.

The scoring assembly 22 consists of the first bridge housing 40 having a central aperture 56 therethrough. A lower scoring die 58, as best seen in FIG. 8, is secured to the recessed seat 34 in the base 14 within the first bridge housing 40. A piston 60, as best seen in FIG. 7, has an enlarged head 62 on a top end, an upper scoring die 64 formed on a bottom end, which slideably fits into the central aperture 56 on the first bridge housing 40 and a vertical guide groove 66. A spring 68 is on the piston 60, between the enlarged head 62 and a top surface of the first bridge housing 40, to normally bias the upper scoring die 64 away from the lower scoring die 58. A space between the upper scoring die 64 and the lower scoring die 58 will be in a proper alignment with the first slot 36, so as to receive the broken saw blade 12. A first guide pin 70 extends upwardly from the recessed seat 34, through the lower scoring die 58 and into the vertical guide groove 66 in the piston 60, to keep the upper scoring die 64 aligned with the lower scoring die 58. When a hammer strikes the enlarged head 62 of the piston 60, the scoring pattern of the new shank 24 will be placed onto the end of the broken saw blade 12.

The base 14 has an opening 72 therethrough directly under the lower scoring die 58. The lower scoring die 58 has a cone shaped channel 74, directly over the opening 72 in the base 14. A hole punch 76 extends downwardly through the upper scoring die 64 in the piston 60, which is directly over the cone shaped channel 74 in the lower scoring die 58, so as to punch a hole 78 through the new scored shank 24 in the saw blade 12, as shown in FIG. 1.

The punching out unit 28 consists of the second bridge housing 50, having a central threaded aperture 80 therethrough. A lower cutting die 82, also shown in FIG. 8, is secured to the recessed seat 34 in the base 14 within the second bridge housing 50. A die holder knob 84 has a hex head 86 with a knurled portion 88 on a top end, a threaded shank 90 and a connector 92 on a bottom end. The threaded shank 90 threads into the central threaded aperture 80 in the second bridge housing 50. An upper cutting die 94 has a vertical guide groove 96 and a top socket 98, which is coupled in a removable manner to the connector 92 on the bottom end of the die holder knob 84. A dowel 100 extends horizontally through the top socket 98 in the upper cutting die 94 and transversely past the connector 92, so that the upper cutting die 94 will move without rotating.

A second guide pin 102 extends upwardly from the recessed seat 34, through the lower cutting die 82 and into the vertical guide groove 96 in the upper cutting die 94, to keep the upper cutting die 94 aligned with the lower cutting die 82. When the die holder knob 84 is tightened, the new shank 24 will be punched out from the end of the broken saw blade 12.

| LIST OF REFERENCE NUMBERS |
| --- |
| 10 device |
| 12 saw blade |
| 14 base |
| 16 mounting facility for 14 |
| 18 work surface |
| 20 first station on 14 |
| 22 scoring assembly in 20 |
| 24 new shank of 12 |
| 26 second station on 14 |
| 28 punching out unit |
| 30 hole in 14 |
| 32 screw |
| 34 recessed seat in 14 |
| 36 first slot in 14 |
| 38 second slot in 14 |
| 40 first bridge housing |
| 42 attaching structure for 40 |
| 44 threaded aperture in 34 of 14 |
| 46 bore in 40 |
| 48 bolt |
| 50 second bridge housing |
| 52 affixing assembly for 50 |
| 54 opening in 50 |
| 56 central aperture in 40 |
| 58 lower scoring die |
| 60 piston |
| 62 enlarged head on 60 |
| 64 upper scoring die on 60 |
| 66 vertical guide groove in 60 |
| 68 spring |
| 70 first guide pin |
| 72 opening in 14 |
| 74 cone shaped channel in 58 |
| 76 hole punch |
| 78 hole in 24 |
| 80 central threaded aperture in 50 |
| 82 lower cutting die |
| 84 die holder knob |
| 86 hex head on 84 |
| 88 knurled portion on 84 |
| 90 threaded shank of 84 |
| 92 connector on 90 |
| 94 upper cutting die on 92 |
| 96 vertical guide groove in 94 |
| 98 top socket in 94 |
| 100 dowel |
| 102 second guide pin |

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A device for repairing a broken reciprocating saw blade comprising:

a) a base;

b) means for mounting said base to a work surface, said mounting means including said base having a plurality of spaced apart holes therethrough, and a plurality of screws, each inserted through one said hole in said base and then threaded into the work surface, so as to maintain said base to the work surface;

c) a first station on said base, said base including a recessed seat extending thereacross, having a first slot and a second slot spaced away from said first slot, with both said slots extending at a slight angle away from said recessed seat, said first station including a first bridge housing, and means for attaching said first bridge housing within said recessed seat in said base, said attaching means including said base having a plurality of spaced apart threaded apertures within said recessed seat, said first bridge housing having a plurality of spaced apart bores, which align with one half of said threaded apertures within said recessed seat when said first bridge housing is inserted therein, and a plurality of bolts, each inserted into one said bore in said first bridge housing and then threaded into one said aligned threaded aperture in said recessed seat of said base, to hold said first bridge housing thereto;

d) means in said first station, for scoring a pattern of a new shank onto an end of a broken saw blade that is inserted into said first station;

e) a second station on said base, said second station including a second bridge housing, and means for affixing said second bridge housing within said recessed seat in said base next to said first bridge housing, said affixing means including said second bridge housing having a plurality of spaced apart openings, which align with the other half of said threaded apertures within said recessed seat, when said second bridge housing is inserted therein next to said first bridge housing, and a plurality of bolts, each inserted into one said opening in said second bridge housing, then threaded into one said aligned threaded aperture in said recessed seat of said base to hold said second bridge housing thereto, said scoring means including said first bridge housing having a central aperture therethrough, a lower scoring die secured to said recessed seat in said base within said first bridge housing, a piston having an enlarged head on a top end, an upper scoring die formed on a bottom end, which slideably fits into said central aperture in said first bridge housing and a vertical guide groove; a spring on said piston between said enlarged head and a top surface of said first bridge housing to normally bias said upper scoring die away from said lower scoring die, so that a space between said upper scoring die and said lower scoring die will be in a proper alignment with said first slot, so as to receive the broken saw blade; a first guide pin extending upwardly from said recessed seat, through said lower scoring die and into said vertical guide groove in said piston, to keep said upper scoring die aligned with said lower scoring die, so that when a hammer strikes said enlarged head of said piston, the scoring pattern of the new shank will be placed onto the end of the broken saw blade; and f) means in said second station, for punching out the new shank from the end of a broken saw blade that is inserted into said second station.

2. A device as recited in claim 1, further including:

a) said base having an opening therethrough directly under said lower scoring die;

b) said lower scoring die having a cone shaped channel directly over said opening in said base; and c) a hole punch extending downwardly through said upper scoring die in said piston, which is directly over said cone shaped channel in said lower scoring die, so as to punch a hole through a new scored shank in the saw blade.

3. A device as recited in claim 2, wherein said punching out means includes:

a) said second bridge housing having a central threaded aperture therethrough;

b) a lower cutting die secured to said recessed seat in said base within said second bridge housing;

c) a die holder knob having a hex head with a knurled portion on a top end, a threaded shank and a connector on a bottom end in which said threaded shank threads into said central threaded aperture in said second bridge housing;

d) an upper cutting die having a vertical guide groove and a top socket coupled in a removable manner to said connector on said bottom end of said die holder knob;

e) a dowel extending horizontally through said top socket in said upper cutting die and transversely past said connector, so that said upper cutting die will move without rotating; and f) a second guide pin extending upwardly from said recessed seat, through said lower cutting die and into said vertical guide groove in said upper cutting die, to keep said upper cutting die aligned with said lower cutting die, so that when said die holder knob is tightened a new shank will be punched out from a end of the broken saw blade.

* * * * *